(12) United States Patent
Liu

(10) Patent No.: US 7,440,172 B2
(45) Date of Patent: Oct. 21, 2008

(54) OPTICAL AMPLIFIER

(75) Inventor: Yunqu Liu, Kanata (CA)

(73) Assignee: Viscore Technologies Inc., Kanata, Ontario (CA)

( * ) Notice: Subject to any disclaimer, the term of this patent is extended or adjusted under 35 U.S.C. 154(b) by 111 days.

(21) Appl. No.: 11/473,164

(22) Filed: Jun. 23, 2006

(65) Prior Publication Data

US 2007/0009263 A1    Jan. 11, 2007

Related U.S. Application Data

(60) Provisional application No. 60/693,074, filed on Jun. 23, 2005.

(51) Int. Cl.
*H01S 3/00*    (2006.01)

(52) U.S. Cl. ............................ 359/337.3; 359/341.3

(58) Field of Classification Search ............... 385/4; 359/337.12, 337.3, 337.33, 341.33
See application file for complete search history.

(56) References Cited

U.S. PATENT DOCUMENTS

| | | | |
|---|---|---|---|
| 5,233,463 A * | 8/1993 | Grasso et al. | 359/341.33 |
| 5,535,050 A | 7/1996 | Suyama | |
| 6,122,413 A * | 9/2000 | Jiang et al. | 385/1 |
| 6,172,803 B1 * | 1/2001 | Masuda et al. | 359/337.12 |
| 6,307,670 B1 * | 10/2001 | McNamara | 359/341.33 |
| 6,424,445 B1 | 7/2002 | Tsushima et al. | |
| 6,441,953 B1 * | 8/2002 | Cowle et al. | 359/341.3 |
| 6,690,501 B2 | 2/2004 | Li et al. | |
| 6,876,491 B2 | 4/2005 | Li et al. | |
| 6,954,305 B2 * | 10/2005 | Kakui | 359/337.3 |

* cited by examiner

*Primary Examiner*—Quyen P Leung
(74) *Attorney, Agent, or Firm*—Gordon Freedman; Freedman and Associates

(57) ABSTRACT

An doped fiber optical amplifier featuring an optical component having first wavelength division multiplexer, an isolator and a second wavelength division multiplexer is described. The isolator supports the propagation of optical signals within a predetermined signal wavelength range in one direction. Pump signals having a wavelength within a pump wavelength range are diverted by the wavelength division multiplexers to inhibit coupling of the pump signals with the isolator. The optical amplifier supports the use of relatively high-powered optical pump lasers. The optical component is optically disposed between different lengths of doped fiber and serves to reduce optical noise within the amplifier.

18 Claims, 4 Drawing Sheets

OPTICAL AMPLIFIER

This application claims benefit from U.S. Provisional Patent Application No. 60/693,074 filed Jun. 23, 2005 the entire contents of which are incorporated herein by reference.

FIELD OF THE INVENTION

The invention relates to optical fibre communication systems. More specifically, the invention relates to optical amplifiers such as erbium doped fibre amplifiers (EDFA), yttrium doped fibre amplifiers (YDFA) and hybrid optical components for use in optical amplifiers.

BACKGROUND

One of the key advantages of modem optical communications systems is that a single optical waveguide is able to support a variety of distinct optical signals, each having a somewhat different characteristic wavelength range. Further, when the optical signals are provided in a same wavelength communication band a single optical amplifier supports the amplification of each of these signals individually. The deployment of this technology has facilitated a reduction in cost of transmitting data over long distances. In U.S. Pat. No. 5,535,050 by Suyama an optical amplifier featuring "an optical fiber which may be doped with a rare earth element." (reference Abstract of Suyama.)

Optical amplifiers support a variety of complex optical networking devices. For example in U.S. Pat. No. 6,424,445 by Tsushima et al. optical amplifiers are used to support an optical repeater featuring an optical cross-connect. The device of Tsushima et al. clearly demonstrates that optical amplifiers have uses that are not restricted to propagating optical data over long distances.

Unfortunately, the cost of optical amplifiers, such as erbium doped fibre amplifiers (EDFA) and yttrium doped fibre amplifiers (YDFA) is still very high because a variety of the components used in their design remain difficult to produce commercially.

It would be beneficial to provide a less expensive optical amplifier that provides higher reliability than conventional EDFAs and YDFAs with comparable performance.

SUMMARY OF THE INVENTION

Embodiments of the invention support an optical amplifier comprising: an amplifier input port for receiving external optical signals having wavelengths corresponding to a first predetermined communications band; an amplifier output port; a high energy pump laser for providing a pump signal at a predetermined pump wavelength to a high energy pump laser output port; a first length of doped fibre having a first end and a second end opposite the first end, the first length of doped fibre for transferring optical energy provided by an optical signal provided by the high energy pump laser at the predetermined pump wavelength to optical signals having wavelengths corresponding to the first predetermined communications band; a second length of doped fibre having a first end and a second end, the second length of doped fibre for transferring optical energy provided by an optical signal by the high energy pump laser at the predetermined pump wavelength to optical signals having wavelengths consistent with the first predetermined communications band, the second end of the second length of doped fibre optically coupled to the amplifier output port; a coupler comprising a first coupler input port for receiving the high energy pump signal, the coupler optically disposed to support coupling of the high energy pump signal to each of the first length of doped fibre and the second length of doped fibre; and, a hybrid comprising a hybrid input port; and, a hybrid output port, the hybrid for propagating optical signals at the first predetermined communications band incident the hybrid input port to the hybrid output port, the hybrid for attenuating optical signals at the first predetermined communications band incident the hybrid output port, the hybrid for propagating optical signals at the predetermined pump wavelength incident the hybrid input port to the hybrid output port, the hybrid input port optically coupled to the second end of the first length of doped fibre, the hybrid output port optically coupled to the first end of the second length of doped fibre.

Further, embodiments of the invention make use of a method comprising: receiving an external optical signal at an input port, the external optical signal having a wavelength within a predetermined wavelength range; providing a pump laser for providing a pump signal having a pump signal wavelength; providing a first optical signal amplifying medium for transferring energy from the pump signal to signals within the predetermined wavelength range propagating therein; providing a second optical signal amplifying medium other than the first optical signal amplifying medium, the second optical signal amplifying medium for transferring energy from the pump signal to signals within the predetermined wavelength range propagating therein; optically coupling the pump laser to each of a first optical signal amplifying medium and the second optical signal amplifying medium; providing an optical isolator optically disposed between the first optical signal amplifying medium and the second optical signal amplifying medium, the isolator disposed to inhibit optical signals having a wavelength within the predetermined wavelength range from propagating from the second optical signal amplifying medium to the first optical signal amplifying medium, the isolator disposed to other than inhibit optical signals having a wavelength within the predetermined wavelength range from propagating from the first optical signal amplifying medium to the second optical signal amplifying medium; propagating the external optical signal from the input port to the second optical signal amplifying medium via the first optical signal amplifying medium and the isolator; and, providing additional optical components optically proximate the isolator for inhibiting coupling of the pump signal with the isolator.

BRIEF DESCRIPTION OF THE DRAWINGS

The invention is now described with reference to the drawings in which.

DETAILED DESCRIPTION OF EMBODIMENTS OF THE INVENTION

Figure 1:
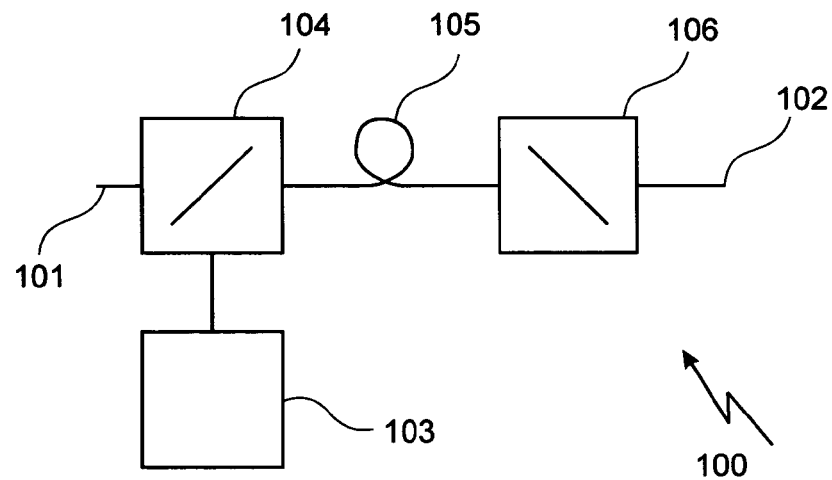
FIG. 1 is a simplified diagram of a prior art optical amplifier with a single pump laser.

Referring to FIG. 1, a prior art optical amplifier 100 is shown. The optical amplifier 100 comprises: an input port 101, an output port 102, a pump laser 103, a first wavelength division multiplexer (WDM) 104, a length of doped fibre 105 and a second WDM 106. In use, an input optical signal is provided incident the input port 101. The input optical signal has a wavelength within a predetermined first wavelength range. Optionally, the input optical signal is a wavelength division multiplexed signal comprising component signals, each having a wavelength with a non-overlapping characteristic wavelength range within the predetermined first wavelength range. The input optical signal is coupled to a waveguide that supports the propagating of the input optical signal to the first WDM 104. The pump laser 103 provides a pumping optical signal having a second wavelength range, the second wavelength range not overlapping the first wavelength range. The WDM 104 combines these two optical signals and provides them to the doped fibre 105. The doped fibre 105 is optionally one of an erbium doped fibre and a yttrium doped fibre. The two optical signals propagate within the doped fibre 105. Molecules within the doped fibre 105 absorb energy from the pumping optical signal. These molecules, having absorbed energy from the pumping optical signal become highly energized. The energized molecules dissipate some of this energy to the input optical signal resulting in an amplification of the input optical signal. The amplified optical signal propagates to the second WDM 106. The second WDM 106 is chosen to couple the amplified optical signal to the output port 102 while preventing the pumping optical signal from propagating to the output port 102. Typically, the pumping optical signal has a lower wavelength than the optical signal being amplified. For example, it is known to pump a 1310 nm optical signal with a 980 nm pump signal. A person of ordinary skill in the art will be aware of other wavelength combinations that are suitable for use with conventional optical amplifiers. One drawback to the prior art device of FIG. 1 is that the amount of amplification is insufficient in some applications. Thus, in many cases it is desired to provide more amplification to the input optical signal than would be practical given a single optical amplifier. One obvious option to overcome this problem is to provide two optical amplifiers according to FIG. 1 in which the output port of a first optical amplifier is optically coupled to the input port of the second optical amplifier. While this is sufficient in some cases, it is clear that such a solution is also quite expensive as the cost of optical amplifiers is often prohibitive to their use.

The amount of power transferred from a pumping optical signal to an external optical signal is practically limited due to noise that frequently occurs in doped fibre amplifiers. Specifically, while statistically rare, occasionally, a highly energized molecule within the doped fibre provides an optical signal at a wavelength consistent with the optical signal being amplified while no such optical signal is present. Thus, it is known that a doped fibre amplifier will contribute a certain amount of optical noise to an optical signal being amplified. The real problem with this noise is that the optical amplifier does not distinguish such noise from the optical signal being amplified. Thus, the optical amplifier may amplify the noise that it generates. Further, the optical noise is as likely to propagate in either direction in the doped fibre. When this occurs it has two detrimental effects. First, it generates optical noise in the system and second, it reduces the amount of pumping energy available for the optical signal. The prior art makes efforts to address these difficulties as described with reference to FIG. 2.

Figure 2:
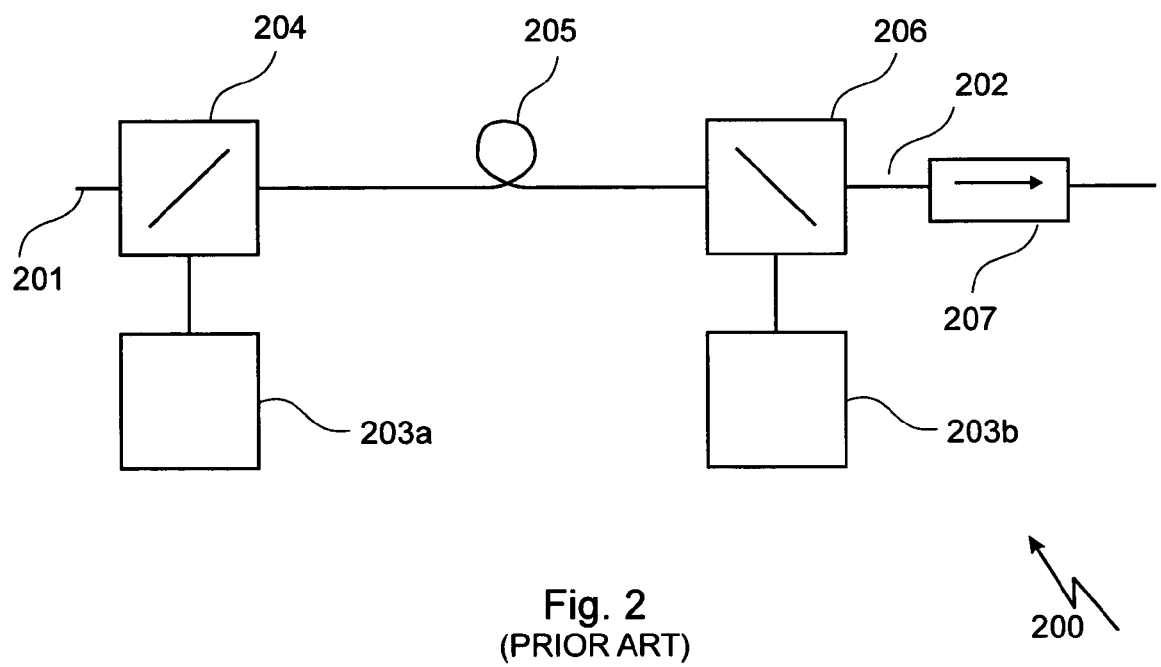
FIG. 2 is a simplified diagram of a prior art optical amplifier featuring two separate pump lasers.

The prior art teaches that a more powerful optical amplifier is optionally built using two separate pump lasers. Each of these pump lasers being used to contribute optical energy to the input optical signal. Referring to FIG. 2, a second optical amplifier 200 according to the prior art is shown. The second optical amplifier 200 comprises: an input port 201, an output port 202, a first pump laser 203a, a second pump laser 203b, a first WDM 204, a length of doped fibre 205, a second WDM 206 and an isolator 207. In use, the second optical amplifier 200 receives an input optical signal at input port 201. This optical signal propagates to the first WDM 204. The first pump laser 203a provides a first pump signal that propagates to the first WDM 204. The input optical signal and the first pump signal then propagate within the length of doped fibre 205. As described with reference to FIG. 1, a portion of the optical energy associated with the pump laser is transferred to the optical signal. The second pump laser 203b provides a second pump signal. The second pump signal propagates backwards in the length of doped fibre 205 via the second WDM 206. As described with reference to FIG. 1, a portion of the optical energy associated with the pump laser is transferred to the optical signal. In this manner the optical signal is amplified by the sum of the optical energies associated with the two pump lasers 203a and 203b. The amplified optical signal propagates to the output port 202 via the second WDM 206. The isolator 207 after the output port 202 is is disposed such that it will not impede an optical signal having a wavelength with a predetermined wavelength range propagating in the desired direction however it will act to prevent any reflected signals from subsequent elements of the optical system entering the second optical amplifier and contributing to optical noise and reduced amplifier efficiency.

Advances in pump laser design and fabrication now allow pump lasers with significantly higher output power. Unfortunately such pump lasers offer only modest benefits to a conventional optical amplifier design. Specifically, the length of doped fibre that both signals propagate within limits the amount of optical power transferred by a pump signal to another optical signal. Thus, when a high powered pump laser is inserted in the optical amplifier of FIG. 1 the length of doped fibre 105 is ideally increased to take advantage of the additional power of the high energy pump signal. If the length of doped fibre is sufficiently long to support the desired enhanced transfer of optical power to the optical signal then it is also expected that the amplified signal would begin adding significant amounts of noise to the optical signal. This noise accumulation acts to limit the amplification applied at each optical amplifier within a network. As such telecommunications pump lasers are typically of output power 200 mW whereas a pump laser for a CATV system with eased noise requirements of 4 W are not uncommon, 20 times higher.

Figure 3:
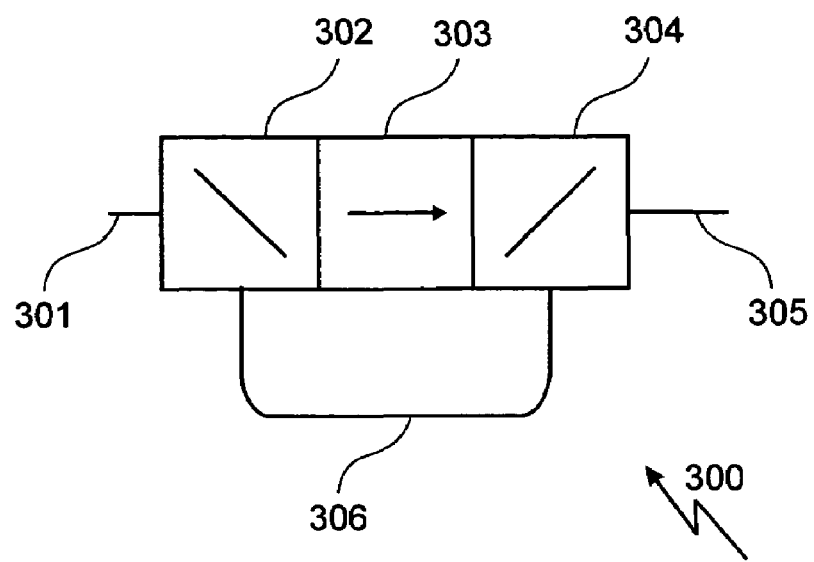
FIG. 3 is a schematic diagram of a hybrid optical component according to a first embodiment of the invention.

Referring to FIG. 3, a hybrid component according to a first embodiment of the invention is shown. The hybrid component 300 comprises: an input waveguide 301, a first WDM filter 302, an isolator 303, a second WDM filter 304, an output waveguide 305 and a bypass waveguide 306. In use, an input signal provided to the input waveguide 301 comprises an optical signal and a pump signal. The first WDM 302 is designed to separate the optical signal from the pump signal. Thus, the optical signal propagates through the isolator 303 and the pump signal is diverted by the first WDM 302 and propagates along the bypass waveguide 306. The optical signal propagates to the second WDM 304 via the isolator 303 and is provided to the output waveguide 305. The pump signal propagates to the second WDM filter 304 via the bypass waveguide 306. The second WDM filter 304 couples the pump signal to the output waveguide 305. In the event that a portion of the optical signal is reflected back into the output waveguide 305 then that portion will propagate along the output waveguide 305 where it will be incident the second WDM filter 304. The second WDM filter 304 couples the reflected optical signal to the isolator 303. Since the reflected optical signal is propagating in the unsupported direction of the isolator 303, the isolator 303 dissipates the reflected optical signal.

Figure 4:
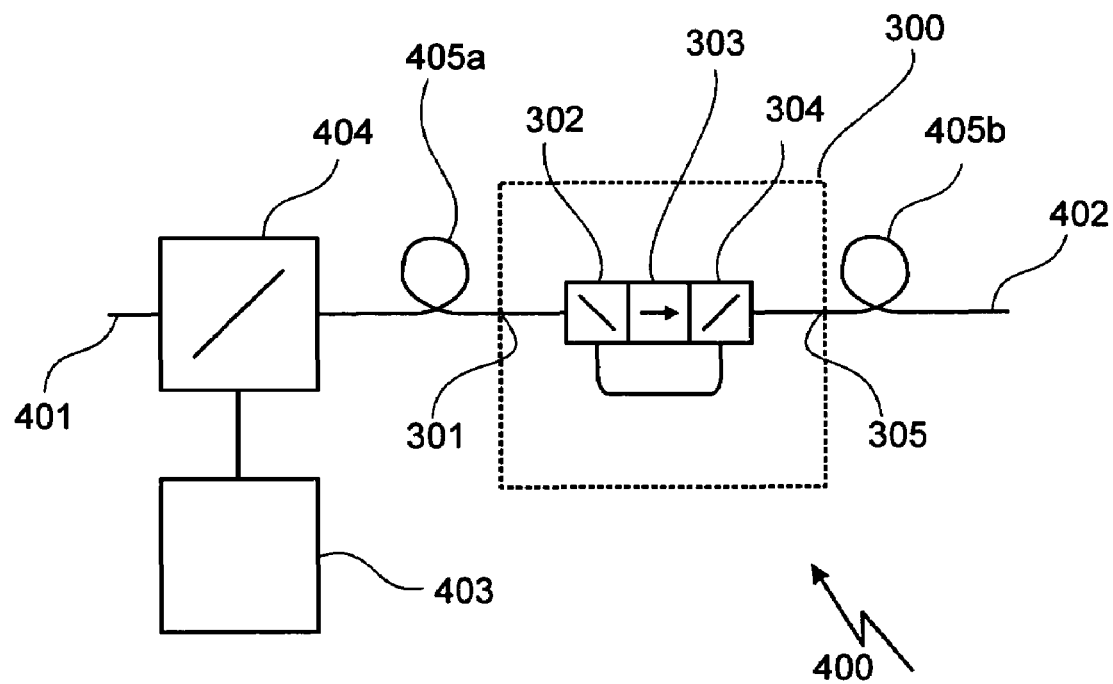
FIG. 4 is a simplified diagram of an optical amplifier featuring the hybrid of FIG. 3.

Referring to FIG. 4, an optical amplifier 400 comprising: an amplifier input port 401; an amplifier output port 402; a pump laser 403; a first length of doped fibre 405a, a second length of doped fibre 405b; a WDM 404, and a hybrid component 300 according to the first embodiment of the invention. In use, external optical signals having a wavelength corresponding to a predetermined communications band are coupled to the amplifier input port 401 and propagate to the first length of doped fibre 405a via the WDM 404. The pump laser 403 provides a pump signal at a predetermined pump signal wavelength. The pump signal propagates to the first length of doped fibre 405a via the WDM 404. A portion of the pump signal is absorbed by the first length of doped fibre 405a and transferred to the external optical signals. The length of the first length of doped fibre 405a has been chosen to provide good amplification absent sufficient length to cause problems associated with generating noise in the external optical signals. The amplified external optical signals and a remaining portion of the pump signal are provided incident the hybrid component 300. The hybrid component 300 couples the amplified external optical signals to an isolator 303 disposed therein. The isolator 303 is disposed to transmit said amplified external optical signals when they are incident the input waveguide 301. The remaining portion of the pump signal is substantially prevented from coupling to the isolator 303 by the first WDM filter 302. The remaining portion of the pump signal is then coupled to the second WDM filter 304 and provided to the output waveguide 305. The amplified external optical signal propagates from the isolator 303 to the output waveguide 305. The remaining portion of the pump signal and the amplified external optical signal are coupled to the second length of doped fibre 405b. The second length of doped fibre absorbs energy from the remaining portion of the pump signal and transfers it to the amplified external optical signal. This transfer of energy further amplifies the amplified external optical signal. In this way, the optical amplifier 400 provides high gain absent incorporation of a second pump laser. The presence of the isolator 303 within the hybrid component 300 serves to attenuate optical noise propagating opposite the correct direction in the optical amplifier 400 and therefore the intensity of back propagating optical noise is maintained at reasonable levels thereby inhibiting a tendency to amplify such noise within the first length of doped fibre 405a.

Figure 5:
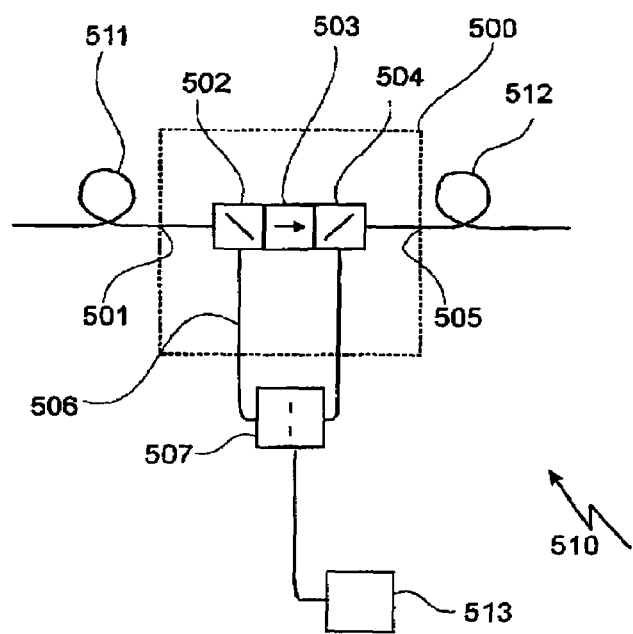
FIG. 5 is a simplified diagram of an optical amplifier featuring a hybrid according to a second embodiment of the invention.

Referring to FIG. 5, a hybrid component 500 according to a second embodiment of the invention is shown in an optical amplifier 510. The hybrid component 500 comprises: an input waveguide 501, a first WDM filter 502, an isolator 503, a second WDM filter 504, an output waveguide 505, and a bypass waveguide 506. The hybrid component 500 is shown optically coupled with to a coupler 507 via the bypass waveguide 506. In addition, first and second lengths of doped optical fibre 511 and 512 are also shown. In use, a pump signal from a pump laser 513 is provided incident the coupler 507. The coupler 507 provides two separate pump signals based upon a predetermined ratio. Thus, a first portion of the pump signal propagates from the coupler 507 to the input waveguide 501 via the first WDM filter 502, and a second portion of the pump signal propagates to the output waveguide via the second WDM filter 504. An optical signal having a wavelength other than the pump wavelength provided incident the input waveguide 501 propagates to the output waveguide 505 via the first WDM filter 502, the isolator 503 and the second WDM filter 504 in that order. The optical amplifier 510 comprises a first length of doped fibre 511 and a second length of doped fibre 512. The first end of the first length of the doped fibre 511 comprises an amplifier input port and the opposite end is coupled to the input waveguide 501. The first end of the second length of the doped fibre 512 is coupled to the output waveguide 505 and the opposite end comprises an amplifier output port. A person of skill in the art will appreciate that in many applications it is desirable to ensure that the pumping optical signals do are inhibited from propagating outside the optical amplifier. When this is the case, it is beneficial to dispose additional optical components that serve to contain the pumping optical signals within the optical amplifier. A person of skill in the art will appreciate that this is easily accomplished by properly coupling suitably chosen WDM components optically proximate the input port and output port of the optical amplifier. Clearly, an obvious choice for such a component is a WDM filter however other components, such as a suitably oriented isolator are optionally used instead. Clearly, the choice of such components is ideally made with an understanding of the application and design criteria of the optical amplifier 510.

Figure 6:
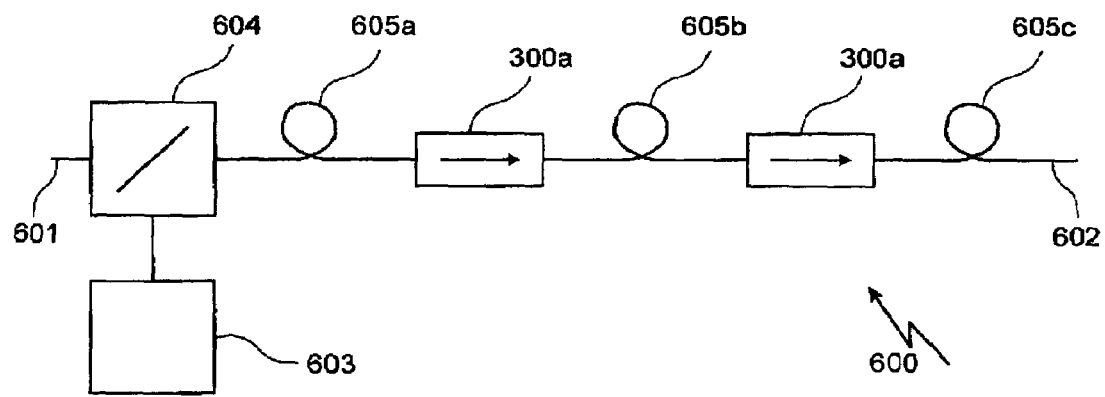
FIG. 6 is a simplified diagram of an optical amplifier featuring two of the hybrids according to FIG. 3; and, FIG. 7 is a simplified diagram of the optical amplifier of FIG. 6 with optical filters for reducing noise.

Referring to FIG. 6, an optical amplifier 600 featuring a pair of hybrid components 300a and 300b is shown. The hybrid components 300a and 300b are described with reference to the hybrid component 300 of FIG. 3. The optical amplifier 600 features three lengths of doped fiber 605a to 605c. The operation of the components is analogous to the operation of analogous components described with reference to FIG. 4. In the case of this optical amplifier 600, it is desired to maintain acceptable levels of optical noise. In use, an external optical signal is coupled to amplifier input port 601. This optical signal is coupled wavelength division multiplexer 604. A pump laser 603 provides a pump signal incident that wavelength division multiplexer 604. The pump signal is then coupled to the first length of doped fibre 605a. The optical signal is coupled to first length of doped fiber 605a where it is amplified when the pump laser 603 provides a pump signal. As described with reference to the first embodiment of the invention, the hybrid components 300a and 300b have a minimal effect on the pump signal and therefore, the pump signal propagates within the three lengths of doped fibre 605a to 605c and provides energy to an external optical signal as it propagates within each of the three lengths of doped fiber 605a to 605c. Optionally, the lengths of doped optical fibre 605a to 605c are shorter than those described with reference to the embodiment of FIG. 4. The reduced length of the three lengths of doped fiber 605a to 605c further reduces the amount of noise present in the doped fiber that propagates opposite the direction of propagation of the external optical signal. Based upon the design of the optical amplifier 600 of FIG. 6 a person of skill in the art will appreciate that other configurations of optical amplifiers also having very low optical noise characteristics are also supported. Specifically, a person of skill in the art may choose to further increase the number of lengths of doped fiber and optionally reduce the individual lengths of the doped fibers.

Figure 7:
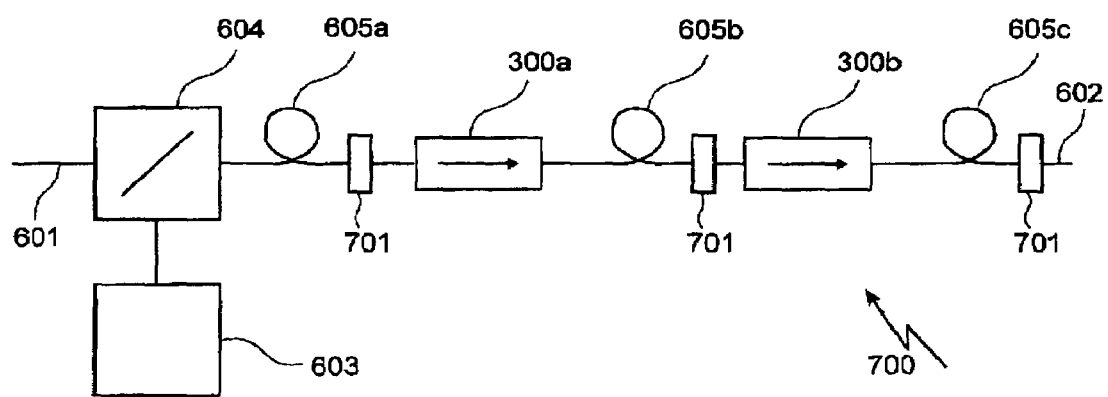

A person of skill in the art will appreciate that optical noise is often generated at the wavelengths that are not consistent with the wavelength range of the external optical signal. Referring to FIG. 7, an optical amplifier 700 featuring additional filters 701 is shown. Reference numerals present in FIG. 7 that are equivalent to those of FIG. 6 have equivalent descriptions and functionality. In many commercial applications it is desired to provide an optical amplifier for amplifying optical signals in a wavelength range of 1520nm to 1580nm. Such an optical amplifier will generate optical noise outside the wavelength range of the optical signals being amplified, in this case for example at 1505 nm. Such optical noise is not desirable simply because it will be amplified as it propagates within the optical amplifier, provided it propagates in the direction of propagation of the external optical signal. When the optical noise is amplified it reduces the amount of optical pumping power available to pumping the external optical signal. In order to reduce noise, filters 701 in the form of WDM components designed to separate external optical signals and pump signals from other optical signals are provided. The filters 701 allow signals propagating within the either of the predetermined ranges of wavelengths associated with pump laser and the external optical signal to propagate with minimal attenuation. Optical signals outside these two predetermined ranges are separated by the filters 701 and optionally dissipated. A person of skill in the art will appreciate that the number and location of the filters 701 is easily changed. Thus, a person of skill in the art is able to balance the cost of adding filters with the desire for reduced noise. Although the filters 701 are shown as independent components in FIG. 7 this need not be the case. Specifically, a person of skill in the art in designing optical components optionally incorporates filters 701 into the hybrid components 300*a* and 300*b* to further reduce costs. Alternatively, the filters are disposed at other locations within the optical amplifier. Clearly, the number and location of such filters 701 as well as the number and location of the hybrid components are chosen based by a person of skill in the art with the objective of providing an optical amplifier with predetermined high quality optical characteristics.

The embodiments of the invention support the use of an amplifier with a single high power pump laser. The prior art amplifier of FIG. 2 achieves many of the performance enhancements of the optical amplifiers described with reference to embodiments of the invention however, in employing multiple separate pump lasers the optical amplifier of FIG. 2 supports additional modes of failure as a failure of any of the pump lasers compromises the performance of the optical amplifier. Additionally, the cost of a high power pump source in addition to the cost the hybrid component according to the embodiments of the invention is less than the cost of two conventional pump laser sources. Thus, the amplifiers as described with reference to FIG. 4 and FIG. 5 are substantially less expensive to produce than prior art equivalents while providing enhanced reliability.

Numerous other embodiments of the invention will be apparent to one of skill in the art without departing from the spirit and scope of the invention. For example, embodiments of the invention are described as using doped fibres. A person of skill in the art will appreciate that optical amplifiers that make use of other amplifying mediums that rely on externally provided pump laser signals will also benefit from the teachings of the invention.

What is claimed is:

1. An optical amplifier comprising:
    an amplifier input port for receiving external optical signals having wavelengths corresponding to a first predetermined communications band;
    an amplifier output port;
    a high energy pump laser for providing a pump signal at a predetermined pump wavelength to a high energy pump laser output port;
    a first length of doped fibre having a first end and a second end opposite the first end, the first length of doped fibre for transferring optical energy provided by an optical signal provided by the high energy pump laser at the predetermined pump wavelength to optical signals having wavelengths corresponding to the first predetermined communications band;
    a second length of doped fibre disposed in series with the first length of doped fibre and having a first end and a second end, the second length of doped fibre for transferring opticle energy provided by an optical signal provided by the high energy pump laser at the predetermined pump wavelength to optical signals having wavelengths consistent with the first predetermined communications band, the second end of the second length of doped fibre optically coupled to the amplifier output port;
    a coupler comprising a first coupler input port for receiving the high energy pump signal, the coupler optically disposed to support coupling of the high energy pump signal to each of the first length of doped fibre and the second length of doped fibre; and,
    a hybrid component comprising a hybrid input port and, a hybrid output port, the hybrid component disposed between the second end of first length of doped fibre and the first end of the second length of doped fibre, the hybrid component for propagating optical signals at the first predetermined communications band incident the hybrid input port, to the hybrid output port, the hybrid component for attenuating optical signals at the first predetermined communications band incident the hybrid output port, the hybrid component for propagating optical signals at the predetermined pump wavelength incident the hybrid input port to the hybrid output port, the hybrid input port optically coupled to the second end of the first length of doped fibre, the hybrid output port optically coupled to the first end of the second length of doped fibre.

2. An optical amplifier according to claim 1 wherein the coupler is a wavelength division multiplexer (WDM).

3. An optical amplifier according to claim 1 wherein the hybrid component is for propagating optical signals at the predetermined pump wavelength incident the hybrid output port to the hybrid input port.

4. An optical amplifier according to claim 1 wherein the hybrid component comprises: an isolator; a first WDM; and, a second WDM.

5. An optical amplifier according to claim 4 wherein the coupler comprises an output port that is optically coupled to the first length of doped fibre.

6. An optical amplifier according to claim 4 wherein the coupler comprises a first output port and a second output port, and wherein the hybrid component comprises: a first bypass port optically coupled to the first output port of the coupler; and, a second bypass port optically coupled to the second output port of the coupler,and wherein the coupler is for coupling the pump signal incident the first coupler input port to both of the second bypass port and the first bypass port.

7. An optical amplifier according to claim 4 wherein the high energy pump laser is the only source of optical signals at the predetermined pump wavelength present in the optical amplifier.

8. An optical amplifier according to claim 4 comprising a filter for filtering optical signals having wavelengths that are outside the first communications band and other than the predetermined pump wavelength, the filter disposed between the first length of doped fibre and the hybrid component.

9. An optical amplifier according to claim 4 comprising a third length of doped fibre disposed in series with both of the first length of doped fibre and the second length of doped fibre.

10. A method comprising:
receiving an external optical signal at an input port, the external optical signal having a wavelength within a predetermined wavelength range;
providing a pump laser for providing a pump signal having a pump signal wavelength;
providing a first optical signal amplifying medium for transferring energy from the pump signal to signals within the predetermined wavelength range propagating therein;
providing a second optical signal amplifying medium other than the first optical signal amplifying medium, the second optical signal amplifying medium for transferring energy from the pump signal to signals within the predetermined wavelength range propagating therein;
optically coupling the pump laser to each of a first optical signal amplifying medium and the second optical signal amplifying medium;
providing an optical isolator optically disposed between the first optical signal amplifying medium and the second optical signal amplifying medium, the isolator disposed to inhibit optical signals having a wavelength within the predetermined wavelength range from propagating from the second optical signal amplifying medium to the first optical signal amplifying medium, the isolator disposed to other than inhibit optical signals having a wavelength within the predetermined wavelength range from propagating from the first optical signal amplifying medium to the second optical signal amplifying medium;
propagating the external optical signal from the input port to the second optical signal amplifying medium via the first optical signal amplifying medium and the isolator; and,
providing additional optical components optically proximate the isolator for inhibiting coupling of the pump signal with the isolator.

11. A method according to claim 10 wherein the first optical signal amplifying medium and second optical signal amplifying medium comprise doped fibre waveguides.

12. A method according to claim 10 wherein the additional optical components comprise wavelength division multiplexers.

13. A method according to claim 12 comprising providing a hybrid optical component comprising a first wavelength division multiplexer, an isolator and a second wavelength division multiplexer disposed for supporting a propagation of an optical signal having a wavelength within the predetermined wavelength range from the first wavelength division multiplexer to the second wavelength division multiplexer via the isolator.

14. An optical amplifier comprising:
an amplifier input port for receiving external optical signals having wavelengths corresponding to a first predetermined communications band;
an amplifier output port;
a high energy pump laser for providing a pump signal at a predetermined pump wavelength to a high energy pump laser output port;
a first length of doped fibre having a first end and a second end opposite the first end, the first length of doped fibre for transferring optical energy provided by an optical signal provided by the high energy pump laser at the predetermined pump wavelength to optical signals having wavelengths corresponding to the first predetermined communications band;
a second length of doped fibre disposed in series with the first length of doped fibre and having a first end and a second end, the second length of doped fibre for transferring optical energy provided by an optical signal provided by the high energy pump laser at the predetermined pump wavelength to optical signals having wavelengths consistent with the first predetermined communications band, the second end of the second length of doped fibre optically coupled to the amplifier output port;
a coupler comprising a first coupler input port for receiving the high energy pump signal, the coupler optically disposed to support coupling of the high energy pump signal to each of the first length of doped fibre and the second length of doped fibre; and,
a hybrid component disposed between the first length of doped fibre and the second length of doped fibre and comprising a bybrid input port optically coupled to the second end of the first length of doped fibre, a hybrid output port optically coupled to the first end of the second length of doped fibre, and a bypass waveguide optically disposed between the hybrid input port and the hybrid output pat the hybrid component for propagating optical signals at the first predetermined communications band incident the hybrid input port to the hybrid output port along a first optical pathway, the hybrid component for attenuating optical signals at the first predetermined communications band incident the hybrid output port, the hybrid component for propagating optical signals at the predetermined pump wavelength incident the hybrid input port to the hybrid output port along a second optical pathway via the bypass waveguide.

15. An optical amplifier according to claim 14 wherein the coupler is a wavelength division multiplexer (WDM).

16. An optical amplifier according to claim 14 wherein the hybrid component is for propagating optical signals at the predetermined pump wavelength incident the hybrid output port to the hybrid input port.

17. An optical amplifier according to claim 14 wherein the hybrid component comprises: an isolator; a first WDM; and, a second WDM.

18. An optical amplifier according to claim 17 wherein the coupler comprises an output port that is optically coupled to the first length of doped fibre.

* * * * *